United States Patent [19]

Epp

[11] 4,162,525
[45] Jul. 24, 1979

[54] POWER SYSTEM HAVING AN INDUCTIVE CHARGE EFFECT LIMITING INVERTER

[75] Inventor: Herbert N. Epp, Palos Verdes Peninsula, Calif.

[73] Assignee: Hughes Aircraft Company, Culver City, Calif.

[21] Appl. No.: 782,659

[22] Filed: Mar. 30, 1977

[51] Int. Cl.² .......................................... H02M 3/335
[52] U.S. Cl. .................................... 363/71; 307/148; 361/341; 363/133; 363/41
[58] Field of Search ........... 307/148; 323/15, DIG. 1; 361/341; 363/131, 133, 71, 41

[56] References Cited

U.S. PATENT DOCUMENTS

| | | | |
|---|---|---|---|
| 3,308,371 | 3/1967 | Studtmann, Jr. | 363/135 |
| 3,958,131 | 5/1976 | Mozdzer | 323/23 X |

*Primary Examiner*—William M. Shoop

*Attorney, Agent, or Firm*—Rafael A. Cardenas; W. H. MacAllister

[57] ABSTRACT

A power system provides a duty cycle modulated high frequency carrier signal to an inductive load with positive and negative buses. During the inductive energy discharge period the energy stored in the inductive load causes a reversal in the polarity of the inductor terminal and tends to drive the new polarity towards infinity. Thus, the magnitude of one of the buses may be increased as the result of duty cycle modulation. First and second inverters are coupled in parallel across the positive and negative buses. First and second series coupled capacitors are also connected in parallel with the inverters. The power inverter senses the increased voltage on the second bus as a result of the inductive energy discharge and transfers that energy back to the first bus. Power may thus be sensed, converted in form, and transferred from one bus to another while conserving 90% of the energy which would otherwise be wasted.

4 Claims, 5 Drawing Figures

Fig. 2.
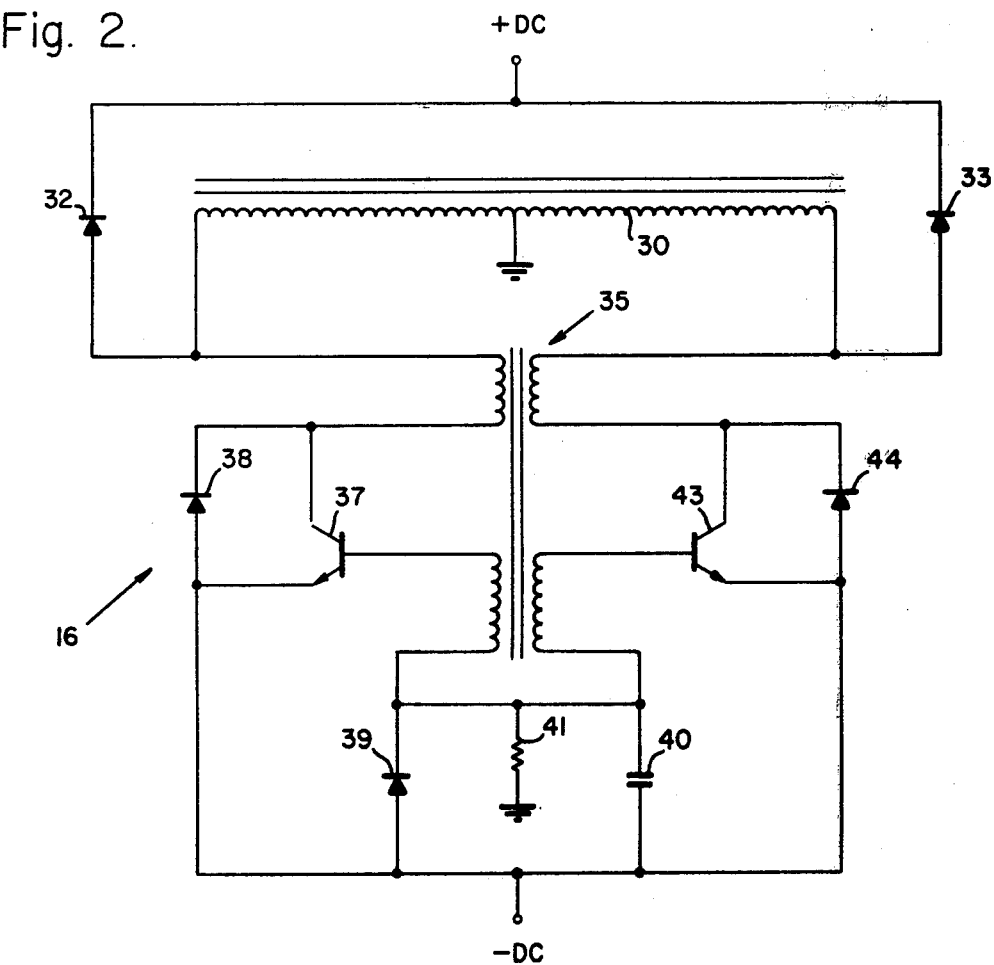
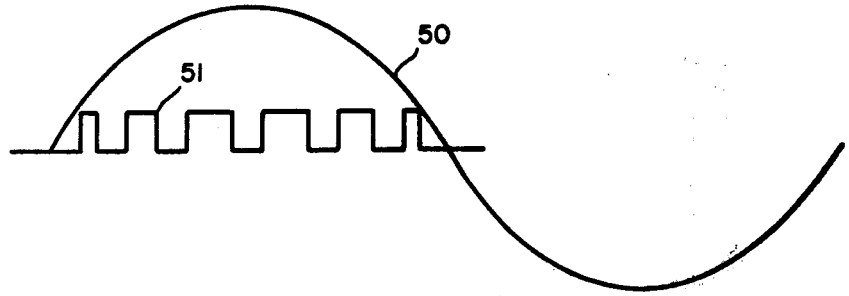
Fig. 3a.
Fig. 3b.
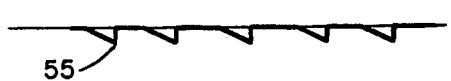
Fig. 3c.

POWER SYSTEM HAVING AN INDUCTIVE CHARGE EFFECT LIMITING INVERTER

The invention herein described was made in the course of or under a contract with United States Air Force.

FIELD OF THE INVENTION

The invention generally relates to power systems and in particular relates to duty cycle modulated power systems for supplying energy to an inductive load.

PRIOR ART

Power systems utilizing duty cycle modulation of high frequency carriers for driving inductive loads such as motors are well known in the prior art; so, too, are power inverters. Such power supplies may provide a signal carrier such as 8 kHz to a load on positive and negative buses. A positive pulse width modulated power signal may be applied to the load for a predetermined time or number of cycles, and then a negative PWM power signal is applied for another predetermined time. As the signals are applied, their pulse width is varies from pulse to pulse; thus, duty cycle modulation. If a pulse signal is applied continuously then there is said to be 100 % modulation, which would result in there being no inductive energy discharge, since all the power applied is being utilized. A signal applied for 75% of a complete cycle is defined as 75% duty cycle and there is an inductive energy discharge during 25% of the cycle. A 50% duty cycle signal results in the load utilizing energy during 50% of a cycle and providing an inductive energy discharge during the other 50%.

The energy which is stored by the inductor must be either utilized or dissipated. For example, during the inductive energy discharge period between positive pulses the voltage at the inductor terminal tends toward negative infinity. Since the inductor is also connected to the negative drive bus through a clamping diode, the inductor provides the stored energy to the negative bus. Generally DC power supplies can only provide energy and not absorb energy. If the energy is to be stored, this may be accomplished by a battery or a suitable large capacitor such that whenever the modulating frequency is low, the voltage excursions remain reasonable. If the inductive load is operated at a sufficiently high modulation frequency, the capacitor may be much smaller. For earth-bound power applications, a large capacitor may pose only few problems. If the energy is to be dissipated, a Zenar diode may be used to clamp the voltage across the inductor and thereby conduct the induced energy to ground. Also, the thermal load as the result of high energy dissipation may pose easily manageable problems. A system such as an orbiting satellite of the spin stabilized variety is placed into the spinning mode by burst from small rocket motors. The spacecraft consists of two independent sections, one which is spun and one which is despun. The despun section includes the antennas which are oriented in a stationary direction. The spun section includes the arrays of solar panels and provides the gyroscopic stability necessary. As the spacecraft is being spun up, the stationary position is simultaneously being despun. Despinning is accomplished by slowly driving the despin motor, which may be a brushless DC motor. Initially the despin motor has a low modulating frequency which increases as the rotational speed of the motor increases. Generally the problem encountered during the initial despinning process is that a great deal of energy is stored in the inductive windings of the motor, thereby requiring either dissipation or storage. At low frequencies, high storage capacitance is necessary and carrying enough capacitors on a spacecraft may be virtually impossible. For instance, during the initial despinning process a series of positive PVM pulses (varied duty cycle) may be applied to the despin motor during the first half electrical cycle of that motor. During the interpulse periods the inductive load is supplying energy to the negative bus and thereby charging a capacitor. During the first half cycle, energy must be continually stored in a sufficiently large capacitor, otherwise the extreme voltage resulting from the continuous addition of charge may cause a component breakdown. Dissipating the energy during the low duty cycle would result in high thermal energy being generated within the spacecraft, which must be dissipated, resulting in inefficiency. In a spacecraft having only limited power supplies, dissipation of the stored energy results in an ineffective use of available power.

OBJECTS OF THE INVENTION

Accordingly, it is an object of the present invention to provide a simple, reliable and efficient power supply system.

It is another object of the present invention to provide an energy transfer system for use with an inductive load.

It is yet another object of the present invention to provide energy transfer from one polarity bus to another during duty cycled operation of an inductive load.

It is still another object of the present invention to provide a power supply system requiring only small storage capacitors and having low thermal dissipation.

SUMMARY OF THE INVENTION

In accordance with the above objects, a power supply system has first and second polarity buses coupled to an inductive load. The power supply provides a signal which is duty cycle modulated. A storage capacitor having a preselected capacitance is coupled to the second bus for storing one inductive energy discharge per cycle from the inductive load. An inverter is coupled between the first and second buses for transferring power from the second bus to the first as a result of increased energy on said second bus due to the inductive energy dissipation of the load.

BRIEF DESCRIPTION OF THE DRAWINGS

FIG. 2 is a schematic circuit diagram illustrating a typical DC to DC inverter for use in the circuit of FIG. 1; and FIGS. 3a–3c are waveform diagrams illustrating voltages at first nodes of the circuit according to FIG. 1.

DETAILED DESCRIPTION OF THE DRAWINGS

Figure 1:
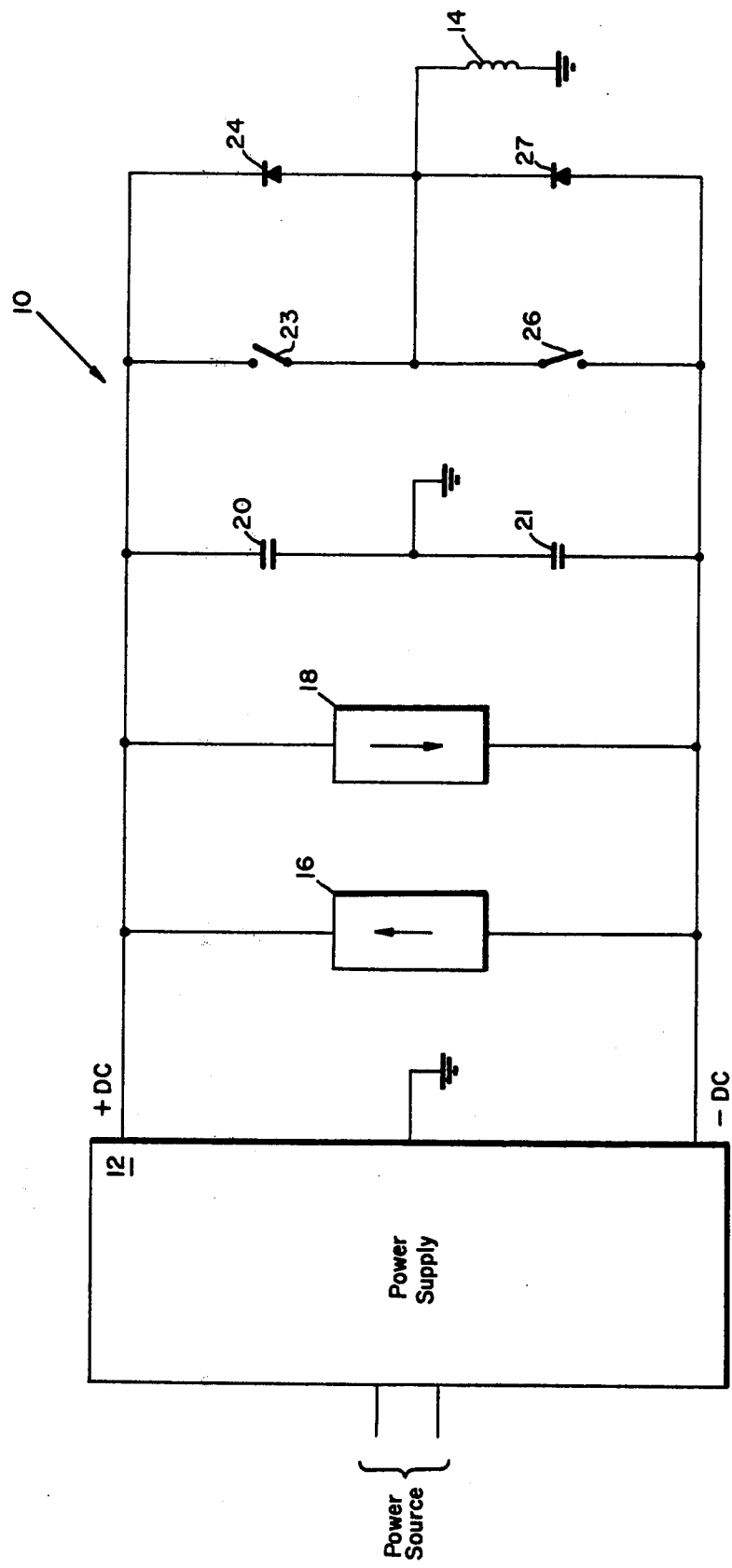
FIG. 1 is a schematic circuit diagram illustrating a power supply utilizing a DC inverter according to the present invention.

Referring more specifically to FIG. 1, a power system 10 includes a power source or generator connected to a power supply 12. The power supply 12 has first and second power buses labeled plus (+) and minus (−), which provide power to a load shown here as an inductor 14. The power supply 12 may be interrupted by switches 23 and 26 to provide a high frequency pulsed power signal having a frequency such as 8 kHz. The 8 kHz signal may be duty cycle modulated for providing an appropriate power signal to the load 14. The load 14 may be any inductive load such as a brushless DC motor which may be used to despin a spin stabilized satellite.

First and second DC inverters 16 and 18, respectively, are connected in parallel across the positive and negative buses. During the operation of the power supply 12 when the absolute value of the positive and negative buses is the same, there is no power transfer from one bus to another by either of the inverters 16 or 18. For example, during a positive or negative pulse, the voltage of both buses is the same, or nearly the same absolute value and there is no power transfer. The first inverter 16 provides power from the negative bus to the positive bus whenever the absolute voltage of the negative bus rises above that of the positive bus. When the positive power to the load is interrupted, such as at the end of a positive pulse, the voltage at the inductor terminal becomes more negative than that of the negative bus as a result of the inductive energy discharge of the load 14 resulting in a charging of a capacitor 21. The inverter 16 senses the voltage change, converts the form of the power and supplies the power to the positive bus. The inverter 18 transfers power from the positive bus to the negative bus whenever the absolute voltage of the positive bus exceeds that of the negative bus, which occurs during the inductive energy discharge after negative pulses.

First and second series connected capacitors 20 and 21, respectively, are connected across the bus lines. The capacitors 20 and 21 are for storing the inductive energy discharge from the inductive load 14, which is then transferred to the opposite bus. A first switch 23 is connected between the positive bus and the input terminal of the load 14. The switch 23 may be any suitable switching device, including a transistor which is capable of handling the power levels required by the load 14. A first clamping diode 24 is connected in parallel to the switch 23 with the cathode electrode being connected to the positive bus. A second switch 26, similar to first switch 23, is connected by the negative bus and the input terminal of the load 14. A second clamping diode 27, similar to the diode 24, is connected in parallel to the second switch 26 with the anode electrode being connected to the negative bus. When the switch 23 provides a positive PWM signal to the load 14 the second diode 27 clamps the induced negative voltage of the load 14 as a result of the inductive energy discharge, thereby causing capacitor 21 to charge to a high negative voltage. As the capacitor 21 is charged to a negative voltage, the inverter 16 transfers power from the negative bus to the positive bus. As a negative PWM signal is being supplied to the load 14, the first diode 24 clamps the induced positive voltage of the load 14 as a result of the inductive energy discharge and the first capacitor 20 is charged to a high positive voltage. This causes the inverter 18 to conduct power from the positive bus to the negative bus.

Referring more specifically to FIG. 2, a typical DC to DC inverter 16 which may be used to transfer power from one bus to another is now described. Other suitable power transfer means may also be utilized. The transformer 30 has two windings with an equal number of turns and the center tap connected to ground or a common bus. The first and second windings are connected to the positive bus through diodes 32 and 33, respectively. The first winding of the transformer 30 is connected through a first winding of a current feedback transformer 35 to the collector electrode of a transistor 37. The base electrode of the transistor 37 is connected to the negative bus through the second winding of the transformer 35 and a bias diode 39. The emitter electrode is connected to the negative bus. An avalanche diode 38 is coupled across the collector and emitter electrodes of the transistor 37 in order to protect the transistor from transient voltages. A base bias capacitor 40 is connected in parallel with the diode 39. The second winding of the transformer 35 is connected to ground through a start-up resistor 41. The third winding of the transformer 35 is connected between the second winding of the transformer 30 and the collector electrode of a transistor 43. The base electrode of transistor 43 is connected to the negative bus by the fourth winding of transformer 35 through the diode 39. The emitter electrode of the transistor 43 is connected to the negative bus. An avalanche diode 44 is connected between the collector and emitter electrodes of the transistor 43 for protection purposes.

The first and second windings of the transformer 30 are alternately connected to the negative voltage for providing a positive output from the diodes 32 and 33. The alternate connection of the windings of transformer 30 to the negative bus is accomplished by the transistors 37 and 43. The transformer 35 provides the signals to switch transistors 37 and 43 and thereby provide the operating frequency of the inverter 16. So long as power is applied to the circuit of FIG. 2, the transistors 37 and 43 are in operation and alternately conduct current. However, power is only transferred from the negative bus to the positive bus by the transistors 37 and 43 when the diodes 32 and 33 are forward biased. The inverter 18 is similar to the inverter 16 with the polarities reversed so that power may be transferred from the positive bus to the negative bus.

Referring briefly to FIG. 3a the sine wave 50 illustrates the low modulation frequency of a slowly rotating inductive motor. Power is applied to the motor by a pulse width modulated or duty cycle modulated 8 kHz signal 51.

FIG. 3b illustrates the voltage wave 53 of the capacitor 21 in the prior art power systems which utilized PWM signals to power an inductive motor. It is apparent from the wave form 51 that the capacitor is continually charged during the interpulse time of the PWM signal 51. The charging would normally continue throughout the entire half wave of the sine wave signal 50.

FIG. 3c illustrates the voltage wave form 55 of the capacitor 51 in a system utilizing power transfer according to the present invention. It is seen that the capacitor 21 is only charged during a single interpulse period and is discharged during the succeeding pulse, thereby eliminating the need of a large storage capacitor for conserving energy.

Although the invention has been shown and described with respect to a particular embodiment, nevertheless changes and modifications obvious to one skilled in the art to which the invention pertains are deemed within the purview of the invention.

What is claimed is:

1. A high efficiency power system having a power supply for providing pulse width modulated power to an inductive load from first and second power buses, each bus having a particular voltage, comprising:

first switch means coupling said power supply and said inductive load for providing pulse width modulated power having a first polarity to said load from said first power bus and for interrupting said power for preselected time periods;

first energy storage means coupled to said second power bus for storing energy from said inductive load having a second plurality during said periods of power interruption;

first energy transfer means coupled between said first and second power buses for converting said energy stored in said energy storage means from said second polarity to said first polarity and for transferring said energy to said first power bus, said first energy transfer means having a transformer having first and second terminals coupled alternately to opposite ones of said first and second power buses so as to periodically reverse the coupling of said transformer across said buses for converting said second polarity energy to said first polarity energy; and first and second diodes coupled to said first and second terminals, respectively, and said first power bus, said diodes for alternately conducting energy from said first energy storage means whenever the absolute voltage of said second bus exceeds the absolute voltage of said first bus.

2. A high efficiency power system providing pulse width modulated power to a load from first and second power buses, comprising:

power supply means for providing power on first and second power buses, each of said buses having a particular voltage;

an inductive load for utilizing power from said power supply means;

first switch means coupling said power supply means and said inductive load for providing pulse width modulated power having a first polarity to said load from said first power bus and for interrupting said power for preselected time periods;

first energy storage means coupled to said second power bus for storing energy from said second power bus having a second polarity during said periods of power interruption; and first energy transfer means coupled between said first and second power buses for converting said energy stored in said energy storage means from said second polarity to said first polarity and for transferring said energy to said first power bus, said first energy transfer means having a transformer having first and second terminals each coupled alternately to opposite ones of said first and second power buses for converting said second polarity energy to said first polarity energy, first and second diodes coupled to said first and second terminals, respectively, for alternately conducting energy from said transformer to said first power bus whenever the absolute voltage of said second power bus exceeds the absolute voltage of said first power bus.

3. A high efficiency power system having a power supply for providing pulse width modulated power to an inductive load from first and second power buses, each bus having a particular voltage, comprising:

first switch means coupling said power supply and said inductive load for providing pulse width modulated power having a first polarity to said load from said first power bus and for interrupting said power for preselected time periods;

first energy transfer means coupled between said first and second power buses for converting said second polarity energy generated by said inductive load during said periods of power interruption to said first polarity energy and for transferring said energy to said first power bus, said first energy transfer means having:

first and second diodes coupled between said first and second power buses for conducting current whenever the voltage on said second power bus is greater than it is on said first power bus;

first and second current switching means coupled to said first and second diodes for alternately conducting current through a transformer in response to a voltage having said greater magnitude; and a transformer having first and second windings coupled to said first power bus through said first and second diodes, said first winding being coupled to said first current switching means, said second winding being coupled to said second current switching means, said first and second windings for alternately conducting current to said first power bus.

4. The invention according to claim 3 further comprises:

second energy transfer means coupled between said first and second power buses for converting said first polarity energy generated by said inductive load during said periods of power interruption to said second polarity energy and for transferring said energy to said second power bus, said second energy transfer means having:

third and fourth diodes coupled between said first and second power buses for conducting current whenever the voltage on said first power bus is greater than the voltage on said second power bus;

third and fourth current switching means coupled to said third and fourth diodes for alternately conducting current through a second transformer in response to a voltage having said greater magnitude; and a second transformer having first and second windings coupled to said second power bus through said third and fourth diodes, said first winding being coupled to said third current switching means, said second winding being coupled to said fourth current switching means, said first and second windings for alternately conducting current to said second power bus.

* * * * *